United States Patent [19]
Lieberman et al.

[11] Patent Number: 5,953,098
[45] Date of Patent: Sep. 14, 1999

[54] CONTACT LENS

[75] Inventors: David M Lieberman, New York, N.Y.;
Jon Grierson, Atwater, Ohio

[73] Assignee: Scientific Optics, Inc., New York, N.Y.

[21] Appl. No.: 09/119,617

[22] Filed: Jul. 20, 1998

Related U.S. Application Data

[63] Continuation of application No. 08/777,470, Dec. 30, 1996, Pat. No. 5,880,809.

[51] Int. Cl.$^6$ .................................................. G02C 7/04

[52] U.S. Cl. ...................................... 351/160 R; 351/177

[58] Field of Search ........................... 351/160 R, 160 H, 351/161, 162, 177

[56] References Cited

U.S. PATENT DOCUMENTS 5,428,412    6/1995    Stoyan ................................. 351/177

*Primary Examiner*—Scott J. Sugarman
*Attorney, Agent, or Firm*—Darby & Darby

[57] ABSTRACT

A contact lens for use with an asymmetric aspherical cornea. The lens includes an anterior surface, a posterior surface and a base. The posterior and anterior surfaces each include a center optical portion and an outer peripheral corneal portion. The posterior surface is divided into a plurality of local surface segments by a plurality of radially extending boundaries that originate from a common center point on the posterior surface of the lens. Each of the local surface segments conforms to the shape of a corresponding local surface portion of the cornea that lies under the respective lens local surface segment when the lens is worn on the eye.

30 Claims, 8 Drawing Sheets

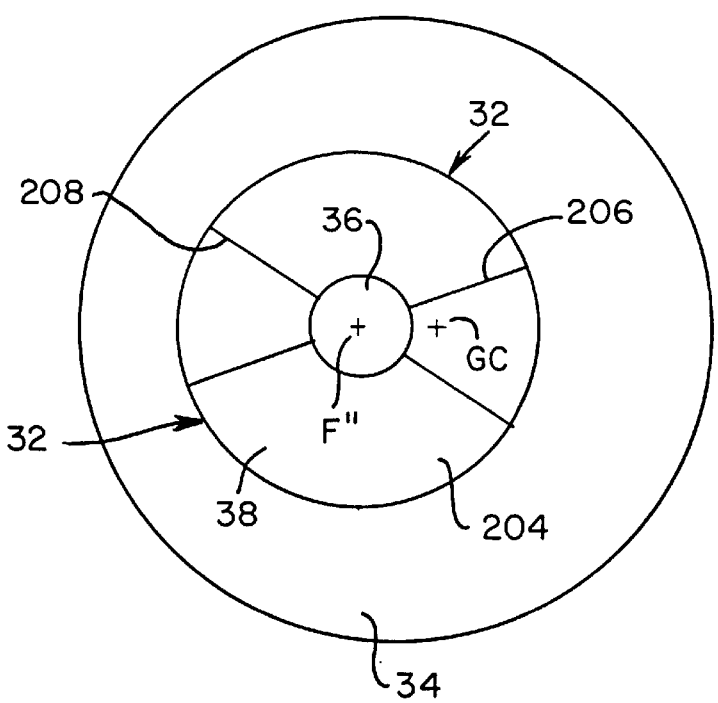
FIG. 13
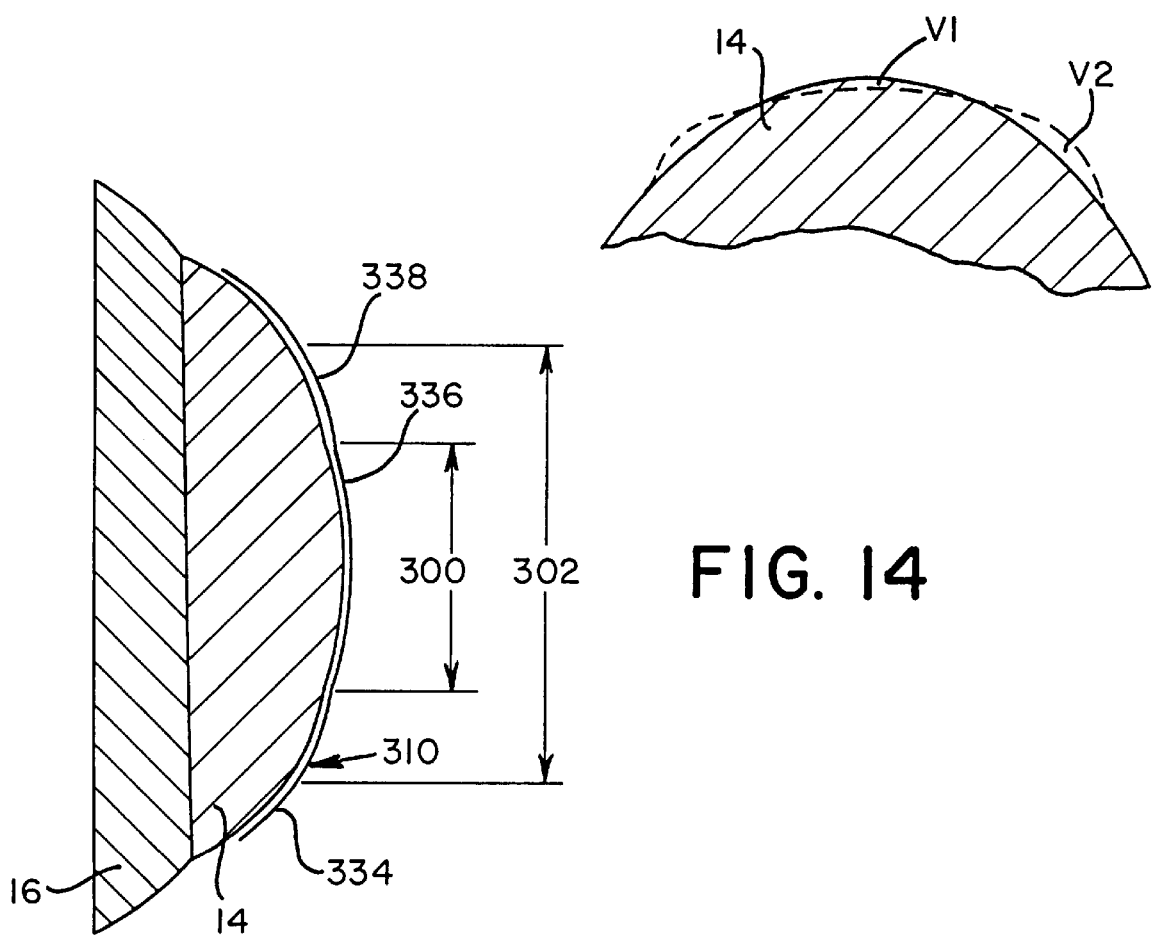
FIG. 15
FIG. 14

CONTACT LENS

This is a continuation, of application Ser. No. 08/777,470, filed Dec. 30, 1996 now U. S. Pat. No. 5,880,809. Each of these prior applications is hereby incorporated herein by reference, in its entirety.

FIELD OF THE INVENTION

The present invention relates generally to contact lenses and to methods of manufacturing contact lenses, and in particular to asymmetric, aspheric individually fitted contact lenses and methods of manufacture thereof.

BACKGROUND AND SUMMARY OF THE INVENTION

Thirty to forty percent of the human population under age 40 develop an ocular refractive error requiring correction by glasses, contact lenses, or surgical means. Refractive errors result when the primary optical elements of the eye, the cornea and the lens, fail to image incoming light directly on the retina. If the image is focused in front of the retina, myopia (nearsightedness) exists. If the eye image is focused behind the retina, hyperopia (farsightedness) exists. The focusing power of the eye or any of the eye's individual components is measured in units called diopters.

Approximately 20% of the patients under 40 having vision defects cannot wear contact lenses because the contact lenses do not fit (become dislodged and/or are very uncomfortable), or they fail to provide the requisite optical correction, or both. In addition, many patients who currently wear contact lenses are not satisfied with the length of time they can wear their lenses and/or with the visual acuity their contact lenses provide.

Over age 40, the percentage of the population requiring vision correction dramatically increases because the crystalline lens of the eye becomes relatively inelastic. The quality of the tear film decreases and the problems encountered with existing contact lenses become much more common and acute.

Standard contact lenses are rotationally symmetrical and spherical and vault from the sclera and rest on the cornea. The human cornea, however, is an "asymmetrically aspheric" surface.

"Aspheric" means that the radius of curvature along a corneal "meridian" (which is an imaginary line on the corneal surface passing through the geometric center of the cornea, analogous to a geographic meridian) is not a constant. Indeed, the corneal curvature tends to flatten progressively from the geometric center to the periphery. "Asymmetric" means that the profile of the corneal curvature along a half-meridian is not the same as (i.e., it is not a mirror image of) the other half of the same meridian. Additionally, "asymmetric" means that the profile of the corneal curvature about a central point (i.e., an origin) is not the same as the corneal profile on the opposite side of the central point. The degree to which the cornea is aspheric and/or asymmetrical varies from patient to patient and within the same person.

Spherical lenses do not match the corneal curvature and geometry, and therefore do not fit properly. The more irregular the patient's cornea the worse the fit, such that about 20% of the patients under age 40 are unable to wear standard contact lenses.

Standard contact lenses are rotationally symmetrical. Sometimes the fitter will generate toric, bitoric and like surfaces in his effort to fit lenses on the cornea. These more complicated lens designs remain inherently rotationally symmetric, i.e., the surfaces are generated about a central point of revolution. Toric lenses are currently made in one of two ways. The first and most common method is to crimp and thus distort the lens blank before placing it in the lathe. After the crimped lens is cut, it is allowed to spring open. The second method is to make the toric lens directly on a lathe.

Because the human cornea has an asymmetrically aspheric surface purely spherical lenses poorly match the corneal curvature and geometry. When the lens is designed as a toric lens, the resultant lens surfaces are still rotationally symmetrical (i.e., these lenses are not asymmetrical and aspheric). In some eyes the discrepancy between the lens and underlying cornea's asymmetry is so great that toric lenses fail to ride on the cornea and/or give satisfactory vision.

In an effort to alleviate these problems, manufacturers developed lenses with varying curvatures on their posterior surface. For example, U.S. Pat. No. 5,114,628 discloses aspherical contact lenses made using corneal topographic data to control a lathe. (The data, as taught in the '628 patent, provide information on the slope of the corneal surface at different points on the cornea and are based on measurements in two dimensions, interpreted three-dimensionally.) The resultant lens is aspherical (in both the anterior and posterior surface) but inherently symmetrical. Although, such a lens may fit some patients better than the standard spherical lenses, other problems such as increased weight and poor tear exchange under the lens can aggravate the patient's vision or comfort. But other patients may experience more discomfort than with the spherical lenses. Thus, this type of aspherical symmetric lens does not provide a substantial improvement in the number of patients that can comfortably wear contact lenses and/or wear contact lenses that provide them with the requisite visual acuity.

U.S. Pat. No. 2,264,080 to Hunter discloses a system for manufacturing a "contoured" scleral contact lens, i.e., a lens resting outside and intentionally vaulting the cornea. Hunter teaches the creation of a mold of the surface of the eye which is then used as a "template" to mechanically radially guide a grinder over the surface of a lens blank. The grinder receives information about the meridional topography of the mold and travels over the surface of the lens blank in a back-and-forth fashion along meridians of the lens. Hunter's scleral lens intentionally has sufficient clearance from the cornea to avoid any contact with the surface of the cornea. Moreover, his method of manufacture causes "ridges" or "cusps" to be formed on the posterior surface of the lens, which if present on a contact lens closely fitted to the cornea would possibly abrade and cause discomfort to the wearer. Additionally, these ridges would extend into the optical field portion of a contact lens, obstructing the patient's field of vision and thereby rendering the contact lens useless. Hunter intentionally avoids forming the anterior surface of the lens in any conformity to the central optical zone of the corneal surface.

Accordingly, there is a need in the art for a better fitting contact lens that will decrease or eliminate the number of patients of all ages who currently cannot wear contact lenses, and provide better comfort and/or visual acuity (including better correction of astigmatism) for patients who now wear contact lenses. U.S. Pat. Nos. 5,502,518 and 5,570,142 both to Lieberman (the present inventor), which are assigned to the same Assignee as the present invention, are both directed to contact lenses that have posterior surfaces that accurately match at least a portion of the surface of the cornea. The '518 and '142 patents satisfied the need for better fitting contact lens. The present invention is a further refinement of the '518 and '142 patents and provides increased acuity by dividing the surface of the lens into a plurality of segments, each of which has a relatively small surface area so that, particularly in the lens' optical region, the posterior surface of the lens will more closely conform to or match the surface of the underlying cornea resulting in negation of the lens effect of the tear film and, hence, improved acuity. The disclosures of U.S. Pat. Nos. 5,502,518 and 5,570,142 are hereby incorporated by reference in their entirety. In the case of inconsistencies, the present description, including definitions, will control.

The present inventor surprisingly discovered that the cornea, in most patients, is actually naturally tilted to a varying degree with respect to the pupillary axis of the eye. Additionally, the degree of corneal tilt varies within the individual cornea depending on the diameter over which the tilt is measured. More specifically, the intersection between the cornea and the sclera (i.e., the base of the cornea) is tilted with respect to a reference plane that is parallel to a tangent at the "high point" of the cornea. Thus, there is a need in the art to design a contact lens that accounts for this natural tilt of the cornea, and as a result fits better and provides better optic correction.

It is an object of the invention to provide a contact lens that accounts for the natural tilt of the cornea.

The present inventor also surprisingly discovered that the cornea is least asymmetrical about a particular point on the cornea which is furthest away on the Z axis with respect to a reference coordinate system, i.e., the "High Point." This point is not necessarily located in the either the cornea's or the contact lens' geometric center. It is an object of the invention to provide a contact lens that accounts for the "High Point", in order to provide better optic correction.

It is another object of the invention to rapidly and economically manufacture custom-fit contact lenses that provide increased visual acuity by aspherically and asymmetrically matching and/or conforming to a portion of the wearer's cornea.

It is another object of the invention to utilize the asymmetrical aspherical contact lens as an orthokeratology lens. More specifically, a posterior surface of a central optical portion of the lens is provided with a flatter shape to displace the cornea while an inner peripheral optical portion of the lens is recessed (i.e., steeper shape) to allow the cornea to bulge radially out in this annular region.

These goals are achieved using information obtained by surface modeling the cornea, and by manipulating this information to design a lens that not only conforms to the overall aspheric and asymmetric shape of the cornea but also takes the local geometry of the cornea into account, including the High Point and Tilt Axis. The process begins by initially scanning the cornea to generate a point cloud, as derived from the surface of the cornea. This point cloud together with the elevation of each point with respect to an arbitrary reference plane is then used to generate a corneal matching surface, preferably using computer 3-D modelling graphics. The high point of the generated corneal matching surface is then determined which corresponds to a point about which the cornea is least asymmetrical. Because refraction is customarily measured in 5° increments, seventy-two (72) polar splines (5×72=360) are generated from the corneal matching surface, one at every 5° interval. Each spline matches the shape of the underlying cornea at each 5° interval. In the preferred embodiment, each of the splines originates from the high point and extends radially outwardly to a predetermined edge boundary of the contact lens that is being designed. Each spline is then divided into portions from which arcs can be created to model individual central and peripheral optic lens surfaces. The boundaries of individual surface segments are defined radially by splines and circumferentially by first or a first and second "drive rails", each of which is formed by the intersection of a cylinder and the corneal matching surface and the smaller one of which is enclosed within the larger one. Relatively small surface segments of the lens are thus created, by well known surface generating formulas, based on the known boundaries formed by the intersection of the arcs, splines and the first drive rail, the second drive rail and the bounded base of the lens. Orthokeratology lenses can also be made based on the same deformation.

BRIEF DESCRIPTION OF THE DRAWINGS

The features and advantages of the present invention will be more fully understood from the following description of preferred embodiments with reference being made to the drawings in which:

FIG. 13 is an elevational view of a lens having an offset center optical zone that includes a center portion and an annular toric portion;

FIG. 14 is a cross-sectional view of an orthokeratology contact lens placed on a cornea; and FIG. 15 is a cross-sectional view of a cornea.

DETAILED DESCRIPTION OF PREFERRED EMBODIMENTS

Figure 1:
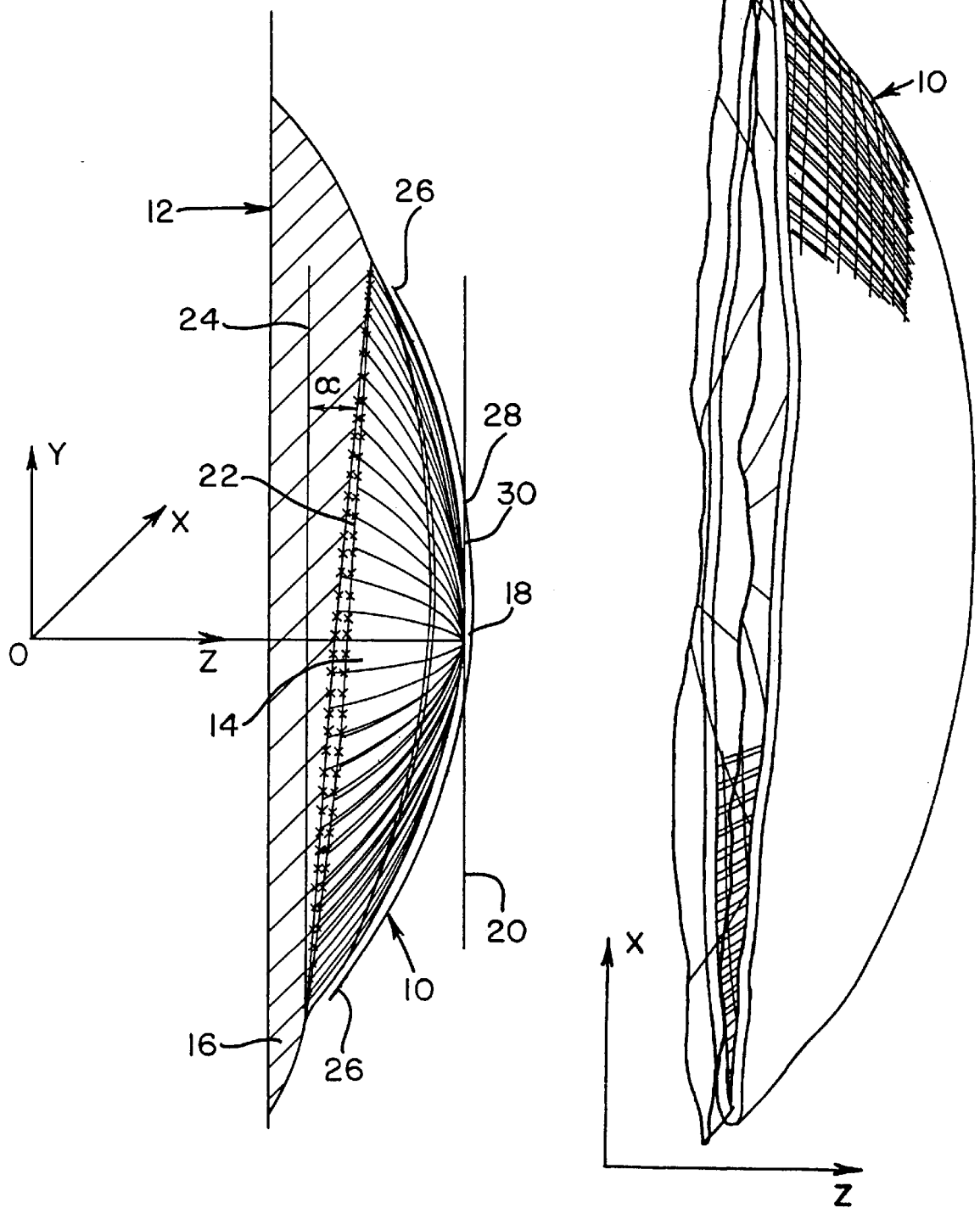
FIGS. 1A and 1B are a side view (i.e., in the Y-Z plane) and a top view (i.e., in the X-Z plane), respectively, of a contact lens placed on a cornea according to the present invention.

Referring now to FIGS. 1A and 1B, an asymmetric aspheric contact lens 10 according to the present invention is illustrated. Contact lens 10 is illustrated placed upon the eye 12 of a wearer. The eye includes a cornea 14 and a sclera 16. Lens 10 preferably rests solely on the corneal portion of the eye. However, in an alternate embodiment, lens 10 can include a scleral skirt and, thus, will drape over a portion of the sclera.

Figure 2:
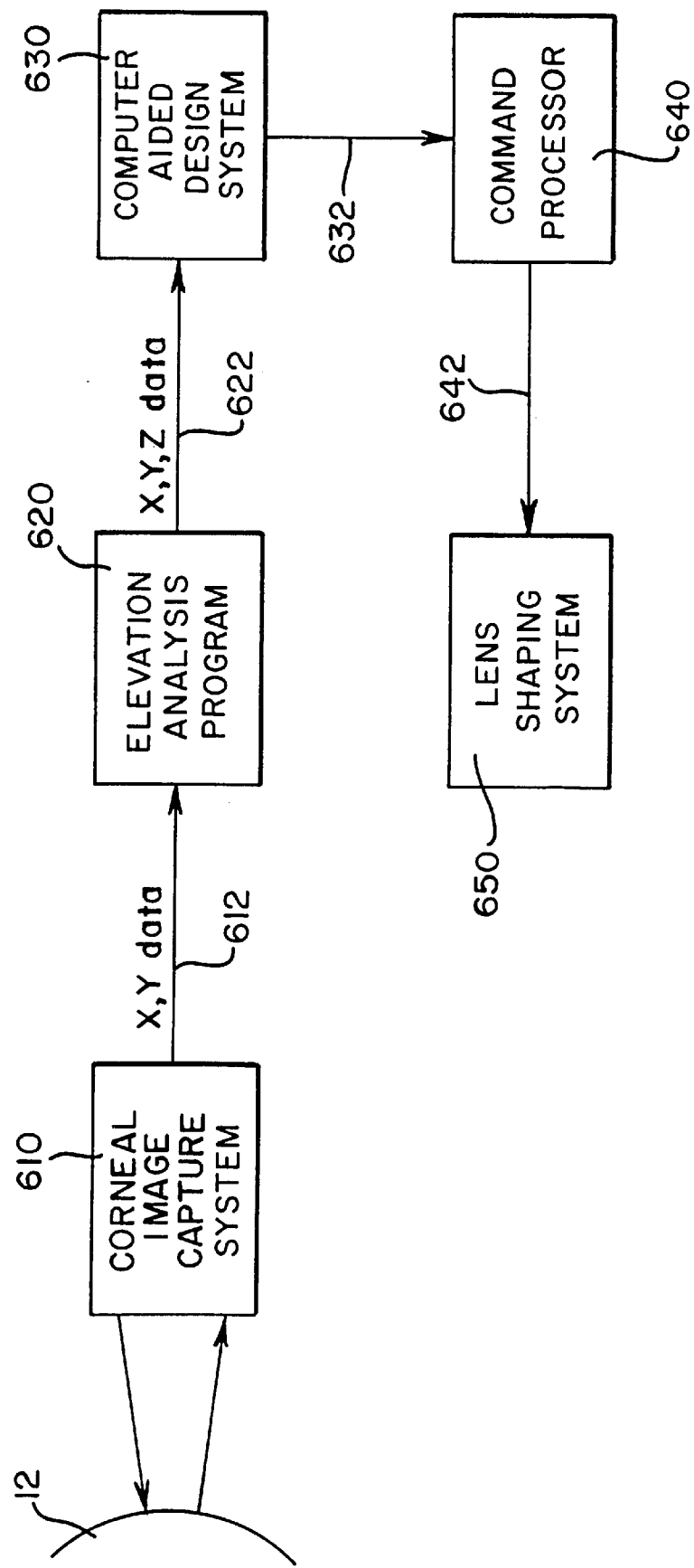
FIG. 2 is a schematic illustration of the system for manufacturing a contact lens.

A process for manufacturing the asymmetric aspheric contact lens of the present invention is schematically illustrated in flow chart format in FIG. 2. The process includes a Corneal Image Capture System 610, an Elevation Analysis Program 620, a Computer Aided Design System 630, a Command Processor 640 and a Lens Shaping System 650. The Corneal Image Capture System 610 is used in conjunction with the Elevation Analysis Program 620 to generate a three dimensional topographic map of the cornea 14 of the patient who is to be fitted with a contact lens.

The Computer Aided Design System 630 is used as an aid in editing or modifying the corneal topographic data before sending the data to a Lens Shaping System 650 via the Command Processor 640. The Command Processor 640 takes the topographic data describing the surface of the lens to be shaped from the Computer Aided Design System 630, and generates a sequence of commands/control signals required by the Lens Shaping System 650. The Lens Shaping System 650 accepts, from the Command Processor 640, a sequence of commands that describe the movements in three dimensions (X, Y, Z in any coordinate system; e.g., cartesian, radial or spherical coordinate)of the Lens Shaping System to shape the particular custom fit contact lens.

The Corneal Image Capturing System 610 and the Elevation Analysis Program 620 are, in a preferred embodiment, the PAR® Corneal Topography System ("the PAR® System"), a system which is available from PAR Vision Systems. The Elevation Analysis Program 620 is preferably a software program executed by a processor. The processor can be custom-designed or can also be an IBM™ compatible PC. Program 620 uses an algorithm to generate a third dimension element, a Z coordinate, for each of the X-Y pairs of data based on the X-Y pair and the brightness of the pixel. One method of calculating the elevation of each point, i.e., the Z coordinate, is by comparing the X-Y and brightness values measured from the patient's cornea 600, to the coordinates and brightness of some reference surface with known elevation, e.g., a sphere of a known radius. (The reference values can be pre-stored in Program 620.) The final output of the Elevation Analysis Program are X-Y-Z coordinates for a multiplicity of points, known as a point cloud (preferably approximately 2000 points or more), on the surface of the cornea 14. A greater number of X-Y-Z triplets enables even greater accuracy in the shaping of the contact lens as described below. It will be apparent to those skilled in the art that any method that can generate X, Y, Z corneal data providing both location and elevation information for points on the corneal surface with the required accuracy can be used. In this embodiment about 1500 points are spaced in a grid pattern, as viewed in the X-Y plane, so that each point is about 200 microns apart, in both the X and Y directions.

The X-Y-Z data output from the Elevation Analysis Program 620 can be formatted in any number of machine-specific ways, all of which are well within the skill of the art. In a preferred embodiment of the present invention, the data are formatted in a Data Exchange File format (DXF). The DXF format is an industry standard format, which is typically used for the inter-application transfer of data. The DXF file is an ASCII data file, which can be read by most of the commonly used Computer Aided Design Systems 630.

Figure 3:
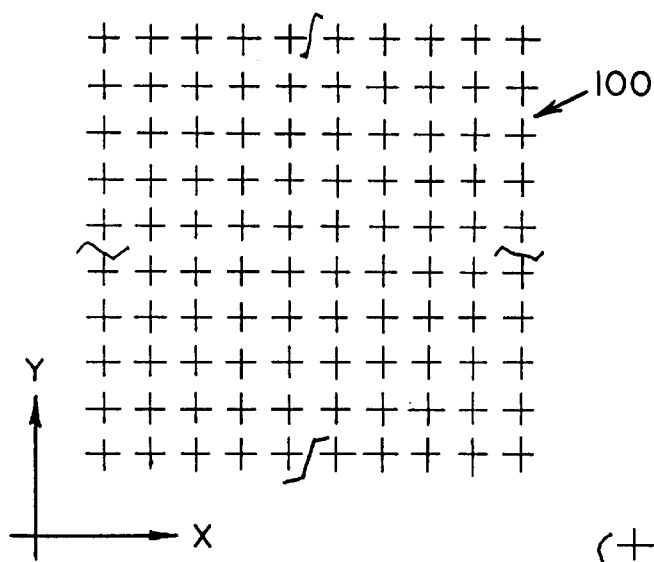
FIG. 3 is a schematic top front view of a point cloud.
Figure 4:
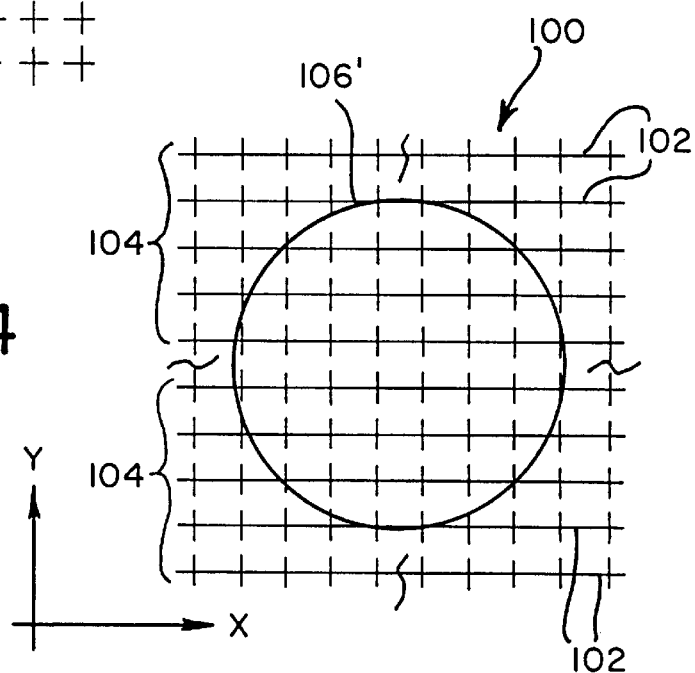
FIG. 4 is a schematic top front view of a point cloud having a plurality of splines connected through the data points.

Referring now to FIGS. 3 and 4, a point cloud 100, as viewed looking along the Z-axis (i.e., in the X-Y plane) is illustrated. Each point corresponds to a particular location on the patient's cornea. The data are usually generated from a portion of the eye that is bounded by an approximately 10mm×10mm area. Thus, there may be as many as 50 rows of data points. A surface 108 that matches the topography of the surface of the patient's cornea is generated by the computer aided design system 630 from the data points output by the Elevation Analysis Program (see FIG. 6). In a preferred embodiment, Computer Aided Design System 630 is the Anvil 5000™ which is available from Manufacturing Consulting Services of Scottsdale, Ariz.

Figure 5:
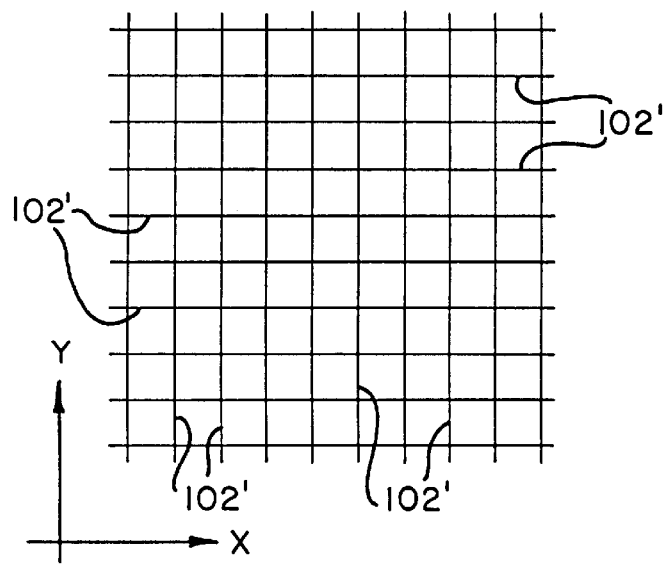
FIG. 5 is a second top front view of another embodiment of a point cloud having a plurality of splines connected through the data points.

In a preferred embodiment, cornea matching surface 108 is generated by first generating a plurality of splines 102 through the data points of the point cloud 100. The generation of a spline that intersects a plurality of data points (i.e., knot points) is, per sé, known to those skilled in the art and can be accomplished by the Anvil 5000™ program once the input data have been entered. For more information regarding the generation of a surface model, see Applicants pending application, Ser. No. 08/731,334, filed on Oct. 11, 1996 and entitled "Method and Apparatus for Improving Vision", the disclosure of which is hereby incorporated by reference. In a preferred embodiment, the known non-rational uniform B-spline formula is used to generate the splines. Of course, the splines could be generated by other well known mathematical spline formulas such as, for example, the cubic spline formula or the rational uniform B-spline formula. As illustrated in FIG. 4, in a currently preferred embodiment, each of the splines 102 extend in a plane that is parallel to the X axis. But the splines could also extend in planes parallel to the Y axis. Referring now to FIG. 5, splines 102' could be generated, some of which extend in planes parallel to the Y axis and the remainder of which extend in planes parallel to the X-axis.

Figure 6:
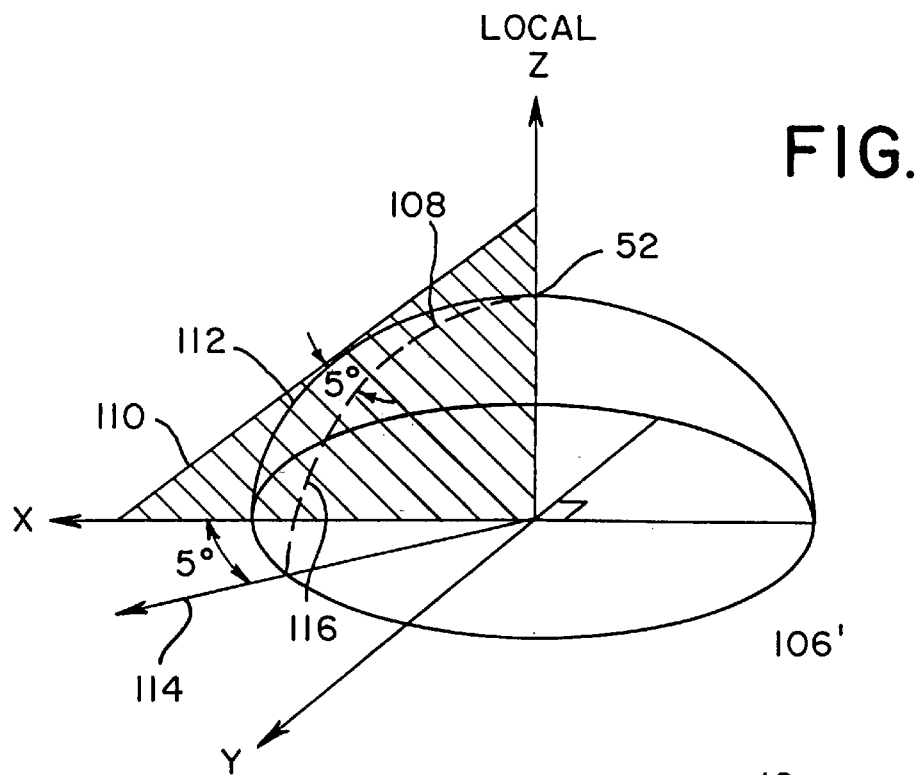
FIG. 6 is a perspective view of a cornea matching surface having a pair of planes intersecting the surface.

Surface 108, as in FIG. 6, which matches the corneal surface of the scanned eye, is now generated from splines 102 or 102'. There are a number of well known mathematical formulas that may be used to generate a surface from a plurality of splines 102. In a preferred embodiment, the well known nurb surface equation formula is used to generate a corneal surface from splines 102. In one embodiment, because the scanned area of the eye is approximately 10 mm×10 mm, approximately 50 splines 102 are created. As illustrated in FIG. 4, to ease the computation of surface 108, a skin surface segment 104 is created for a small number (e.g., five) adjacent splines. Parts of adjacent skin surface segments 104 share a common border spline. Thus, about ten skin surface segments are generated from each point cloud. The ten skin surface segments 104 can then be driven together by the Anvil 5000™ program in a manner known to those skilled in the art to make one composite surface 108, which surface matches the shape of the scanned cornea. (If convenience of computation is of no concern, all 50 splines can be used together to generate a surface without the intermediate step.) Alternatively, the skin surface segments can be used without generating a composite surface. Also, the skin surface segments can be any number that is desired and are not limited to ten.

Neither the original data points, nor the knot points of splines 102 necessarily lie on surface 108, owing to the mathematical generation of the surface when using the nurb surface equation formula. However, the surface 108 estimates those points within a predefined tolerance.

The high point (i.e., the point having the greatest Z value) on the generated corneal matching surface 108 is determined. A cylinder 106 of a predetermined diameter, is then projected onto the corneal matching surface 108 along an axis which is parallel to the Z-axis and passes through the high point (hereinafter referred to as "the local Z-axis"). Cylinder 106 preferably has a diameter of 8 mm–9.5 mm and the intersection of cylinder 106 and surface 108 defines a circle 106', which is the outer dimension of the yet to be shaped contact lens. The high point will preferably be the optical center of the optical portion of the lens by design. The optical center of the lens is preferably disposed about the highest point of the cornea because the cornea is least aspherical at this point and, therefore, provides the best optics at this point. But if a bifocal lens is to be used, the center of the lens may be conveniently placed over the center of the pupil if the center of the pupil differs markedly from the high point. (The pupil center is not necessarily related to the high point of the cornea). The advantage of the bifocal lens having its center placed over the pupil is that when a person looks down (e.g., to read), he or she will look through the high power portion of the lens.

The outer limit of the contact lens (i.e., the 8 mm–9.5 mm diameter circle as viewed in the X-Y plane) must fit within the point cloud so that the posterior and anterior surfaces of the lens can be formed based on the measured corneal data. Design system 630 preferably defaults so that the optical center of the lens is disposed above the high point of the cornea and circle 106' has a radius of 4.75 mm. The computer aided design system 630 can then illustrate a default circle 106' (in the X-Y plane) with respect to the point cloud, for example on a monitor screen, so that the operator can be assured that circle 106' falls within the point cloud. Additionally, system 630 can be set up to determine if circle 106' falls within point cloud 100. Further, if circle 106' does not completely lie within point cloud 100, the user can manipulate the circle (i.e., move the center point and/or change the radius of the circle) so that circle 106' lies within the corneal data point cloud 100. In a worst case scenario, the eye should be rescanned if insufficient data is available from the scanned eye to ensure that the contact lens will properly fit on the patient's cornea. Alternatively, the area of the point cloud can be made larger. It is to be understood that circle 106' is only a circle when viewed in the X-Y plane (i.e., looking along the local Z-axis). In fact, circle 106' is a closed figure that is spaced from the local Z-axis by a constant dimension (i.e., the radius of cylinder 106).

Once an acceptable circle has been chosen, imaginary planes, which contain the local Z-axis of the circle 106' (See FIG. 6), are cut through the generated cornea matching surface 108, see, for example, plane 110. The intersection between plane 110 and surface 108 defines a first curve 112. Plane 110 is then rotated about the local Z-axis at regular intervals, preferably every 5°. Thus, a second plane extends through line 114. The intersection between this second plane and surface 108 defines a second curve 116, which is illustrated in dashed lines in FIG. 6. This process continues, every 5° about the entire local Z-axis of the circle, until seventy-two (72) (3600°÷5°) curves have been defined by the intersection of the planes through the generated cornea matching surface 108. Each of the imaginary planes extends through the common local Z-axis. The number of curves 112 or 116 can be increased without limitation, or decreased. However, it is preferred that it be at least 24.

Each of the seventy-two curves can then be mathematically fitted with a spline (which can be accomplished by system 630) to define each curve so that this information can be processed by the computer aided design system 630. Once again, any one of a number of well known spline formulas can be used to assign a spline formula to each of the seventy-two curves. In a preferred embodiment, the non-rational uniform b-spline formula is used to generate a spline to represent each curve at every 5° cut through the generated surface 108. Thus, a second set of seventy-two splines, one for each of the seventy-two curves, is generated. Each of the second set of splines is preferably a third order equation (i.e., $y=ax^3+bx^2+cx+d$). The knot points on the spline are preferably about 1 to 2 microns apart.

As illustrated in FIG. 1A, the present inventor surprisingly discovered that the cornea 14, in most patients, is naturally tilted relative to the remainder of the eye (i.e., the base of the cornea is not orthogonal to the pupillary axis). The angle of tilt varies from eye to eye within the same person. Also, the angle of tilt varies within the same eye, depending upon whether the tilt angle is measured at the corneal base or at another arbitrarily projected cylinder. For example, the angle of tilt at a 7 mm diameter about the local Z-axis has been surprisingly found to be negligible, while at a 3 mm diameter the angle of tilt is frequently disposed at an angle opposite to that at the base of the cornea. The fact that there is frequently no angle of tilt at the 7 mm projected circle is an interesting natural phenomenon, because this diameter corresponds to the outer extent of the optical portion of the cornea. The angle of tilt may be relative to the X axis and/or the Y-axis.

The base of the cornea (i.e., the transition between the cornea and the sclera) is tilted with respect to the eye. Applicant believes that, on average, the cornea base is tilted by about 2–3° about both the X and Y axes. In fact, Applicant has documented an angle of tilt up to 6°. Hence, any contact lens that fails to account for this tilt does not align the optical portion of the lens properly, resulting in reduced visual acuity.

This angle of tilt a is measured with respect to the X and Y axes of the coordinate system of the point cloud illustrated in FIG. 1A. To determine the angle of tilt α, the high point 18 on the cornea (i.e., the point having the highest Z value) is first determined from the point cloud 100. Plane 20 is drawn tangent to the high point 18 and is at a right angle to the Z axis. An imaginary reference plane 24, which is parallel to tangent plane 20, intersects the corneal base 22. Tilt angle α is the angle disposed between base 22 and reference plane 24. This angle α is the three dimensional angle of tilt of the cornea with respect to the eye. It is noted that the X-Y-Z coordinate system, including the origin, is purely arbitrary and is determined by the elevation analysis program (e.g., the PAR® system).

Lens 10 itself can be considered to have an anterior surface 28, a posterior surface 30 and a base or edge 26. The anterior and posterior surfaces 28, 30 each have a central optical portion 32 and an outer peripheral portion 34 (See FIGS. 7A and 7B). The posterior surface of the peripheral portion 34 asymmetrically and aspherically matches a corresponding peripheral portion of the cornea, which lies under the peripheral portion of the lens when the lens is worn in the wearer's eye.

Center portion 32 of the contact lens is the optical portion of the lens and, in a preferred embodiment, is approximately 7.0 mm–7.5 mm in diameter. Center optical portion 32 is comprised of an inner (central) optical portion 36 and a peripheral optical portion 38. The geometric lens center 52 of the inner central portion 36 (and, thus, of the lens 10) is preferably disposed over the highest point 18 of the cornea. However, for a bifocal contact lens, the geometric center of the inner optical portion 36 maybe disposed over the center of the pupil.

The boundary between the inner optical portion 36 and the peripheral optical portion 38 of the lens is known as a first or inner drive rail 48. Likewise, the boundary between the inner peripheral optical portion 38 and the outer peripheral topographical portion 34 is known as a second or outer drive rail 50. Both drive rails 48 and 50 are generated by projecting a cylinder of a predetermined diameter along the local Z-axis. The intersection of these cylinders and the corneal matching surface 108 defines the first drive rail 48 and the second drive rail 50, respectively. In a preferred embodiment, drive rail 48 has a diameter of 3 mm and drive rail 50 has a diameter of 7.0 mm–7.5 mm and most preferably about 7 mm. The lens itself preferably has an outer diameter of about 8.5 mm to 11 mm, more preferably about 9 mm–9.5 mm and most preferably about 9.0 mm.

To form the surface of lens 10, in a currently preferred exemplary embodiment, the inner optical portion 36 is defined first, then the inner peripheral portion 38 is defined and finally the outer peripheral portion 34 is defined. In each portion 36, 38, 34, the posterior surface is defined first and, thereafter, the anterior surface is defined.

Figure 7A:
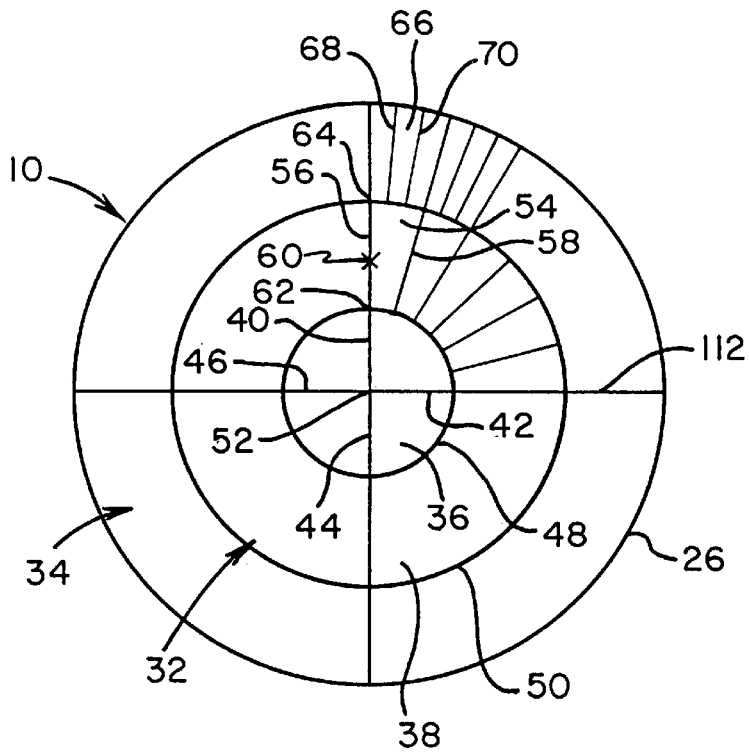
FIGS. 7A and 7B are a top elevational view and a top perspective (i.e., isometric) view, respectively, of the contact lens illustrated in FIGS. 1A and 1B.
Figure 7B:
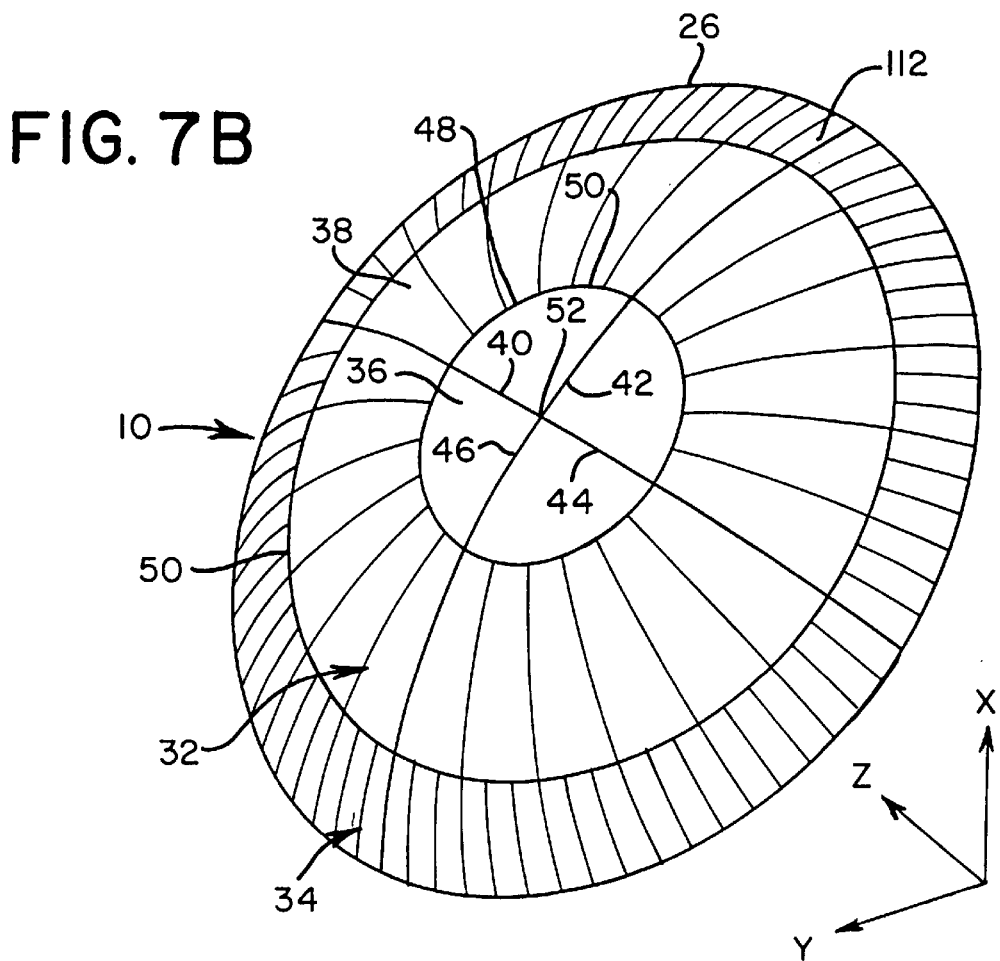

Referring now to FIGS. 7A and 7B, inner optical portion 36 is divided into four quadrants by four arcs, 40, 42, 44, 46. Arcs 40–46 are determined based on the underlying corneal matching surface. Each of the arcs 40–46 originate at a common central point 52 and are shaped to provide the best fit to the underlying corneal surface. The arcs are preferably determined by using the second set of generated splines (112, 116, etc.). As illustrated in FIGS. 7A and 7B, spline 112 corresponds to a polar or radially extending line, as viewed from top down (i.e., along the local Z-axis), and is used to generate arc 42. As should be readily appreciated, three points will define a circular arc. In a preferred embodiment, those three points are central point 52, the point on spline 112 that intersects first drive rail 48 and the radial midpoint of spline 112 between central point 52 and drive rail 48. The radial midpoint of the spline 112 is located at one-half of the radial distance between central point 52 and drive rail 48, as viewed from above. Thus, if drive rail has a radius of 1.5 mm, the midpoint of the spline is located at a radial distance of 0.75 mm from the local Z axis. The remaining three arcs 40, 44, 46 are generated in a similar manner. Because arcs 40–46 are derived from the second set of surface splines, arcs 40–46 are said to conform to the shape of the cornea. Because of the arcuate shape of the rear surface, the front surface which also has an arcuate shape and is made by reference to the back surface (and the desired refractive correction and lens material), provides refraction, i.e., has optical properties which can be used to advantage in providing optical correction. The posterior surface of each inner optical quadrant of the lens in the inner central portion 38 (i.e., the surface bounded by a ¼ portion of drive rail 48 and by any two adjacent arcs 40, 42; 42, 44; 44, 46; or 46, 40) can be generated by any known surface blending formula, once the boundaries of the surface have been defined. In a preferred embodiment, the well known formula $Ax^2+By^2+Cz^2+Dxy+Eyz+Fx2+Gx+Hy+Jz+K=O$; where A, B, C, D, E, F, G, H, J and K are constants, is used to generate each quadrant as a quadric surface. The posterior surface is blended between adjacent arcs, for example, between arcs 40 and 42 from, for example, common central point 52 from first arc 40 along drive rail 48 towards second arc 42. This could be thought of as interpolating between curves 40 and 42 with a series of circular arcs, each of which passes through center 52 and rail 48 at a point progressively closer than the previous arc. Thus, the rear optical quadrant surface of the lens is a blended surface, which is known in the art as a "curve-driven" surface. The remaining three quadrant surfaces of the central lens portion on the posterior surface of the lens are then generated in a similar manner.

The generated posterior surface of the inner optical portion 36 is topography driven. In other words, the shape of the posterior surface of the inner central portion 36 of the lens is dependent upon the shape of the underlying portion of the cornea. Thus, each local surface segment on the posterior surface in the optical portion of the lens conforms to the shape of the respective local portion of the cornea lying under the local surface segment. The posterior surface, in the optical zone, conforms to the shape of the cornea, as opposed to matches the shape of the cornea, because the second set of generated splines (112, 116, etc.) are closely approximately by arcs 40–46. The anterior surface is formed, as described below, by blending between two adjacent arcs whose radius are determined based on the required refraction correction using the known Zeiss Simple Lens formula.

The anterior surface of the inner optical portion is preferably generated after the posterior surface of the lens has been generated. The front surface of the lens is shaped to provide for the preferred optics (e.g., spherical or toric). If a toric surface is to be formed, the front surface can be blended by utilizing the known Zeiss Simple Lens formula, which is conventionally used to shape a toric lens. Of course, before the front surface can be formed the practitioner must first input, to the computer aided design system 630, the corrective refraction required for the wearer. This information can be input in a conventional manner so that the computer aided design system 630 can use this information to determine the shape of the front surface of the lens. Because any two adjacent arcs are disposed at a 90° interval, the Zeiss Simple Lens Formula does not need to be modified. The front surface of the lens is thus formed based on axes in turn based on and coplanar with the posterior surface arcs but offset from the posterior surface arcs to provide for the refractive correction, while maintaining minimum thickness of the lens.

It should be noted that arcs 40–46 do not need to be at 90°: this is only for convenience when the Zeiss formula is used. It should also be noted that the axes disposed 180° apart need not be, and in most cases are not, of equal radii. Thus, the front or anterior surface of the lens is more accurately described as having a multi-toric shape, but, to be consistent with current terminology, the front surface will also be referred to as being torically shaped.

The process for shaping the peripheral optical portion 38 of the lens will now be described. Once again, in a currently preferred exemplary embodiment, the shape of the posterior surface of the lens is first determined. As illustrated in FIGS. 7A and 7B, both the posterior and anterior surface are divided into 15° local surface segments. Each local surface segment is bounded by a ¹⁄₂₄th circumferentially extending portion (360°÷15°) of inner rail 48 and a ¹⁄₂₄th circumferentially extending portion of outer rail 50, as well as by a first radially extending arc and a second radially extending arc. For example, local surface segment 54, which is exemplary of all local surface segments in the inner optical portion, is bounded by a ¹⁄₂₄th portion of inner rail 48 and outer rail 50 and by arcs 56, 58. All of the arcs extend in an essentially polar or radial direction, which arcs originate from origin 52. The shape of arcs 56, 58 is derived from the second set of generated splines and, thus, from the corneal surface lying underneath that portion of the lens. Of course, all of the arcs are shaped so that they clear minimally the underlying cornea. Thus, if necessary (i.e., if one of the arcs interferes with, i.e., contacts or intersects the surface of the cornea), the entire optical portion of the lens is "lifted" to ensure that the posterior surface of the optical portion of the lens clears (i.e., is spaced from) the cornea.

The arcs (such as 56 and 58) are preferably determined by relying on the second set of splines, which match the shape of the underlying cornea. The first point used to define the arc (such as, e.g., point 62 for arc 56) is the point of intersection of the respective spline with the inner drive rail 48. Similarly, the second point of the arc (such as, e.g., point 64 for arc 56) is the point of intersection of the respective spline with the outer drive rail 50. The radial midpoint between drive rail 48 and drive rail 50 (i.e., 60 for arc 56) of each respective spline (e.g., 112, 116 in FIG. 6) is utilized as the third point to define the arc. Because three points define an arc, the arc is simply determined by the circular curve that intersects these three points 60, 62 and 64. The shape of local surface segment 54 is obtained by blending between the two adjacent arcs 56, 58 and between the inner drive rail 48 and the outer drive rail 50 (i.e., the outer boundaries of the local surface segment). It is noted that this blended surface is not derived off a common center point (such as center point 52 for the central portion 36), but is derived from the inner drive rail 48. Thus, these local surface segment blended surfaces are known in the art as curve mesh surfaces. The shape of the posterior surface of the remaining local surface segments, which are disposed in the inner peripheral portion 38 of the optical portion 32 of the lenses is determined in an identical manner to that of local surface segment 54. The overall effect is that each surface segment conforms to the geometry of this corneal surface portion that underlies it.

The front (i.e., anterior) surface of inner peripheral optical portion 38 can once again be determined by using the Zeiss Simple Lens formula. However, because this lens formula is set up to refract in 90° intervals, the formula must be divided by the number of local surface segments, in this case six (6), because the lens in this embodiment is divided into 15° intervals and, therefore, has six (6) local surface segments (i.e., 90°÷15°=6), as illustrated in FIGS. 7A and 7B, for every 90° interval.

The outer peripheral portion 34 of the lens can now be determined. The posterior surface of the outer peripheral portion preferably asymmetrically and aspherically matches the shape of the underlying cornea. In the outer peripheral portion 34, the local surface segments 66 are preferably reduced to 5° segments to reduce the amount of surface area for each segment, so that the resulting shape of the posterior surface of the lens matches the actual shape of the cornea to the greatest extent possible. Each segment 66 is bounded by second drive rail 50 and by base 26 and by a first spline 68 and a second spline 70. Splines 68, 70 are mathematical derived curves that are based on the topographical data of the underlying cornea and provide a best curve fit to the underlying cornea such that the posterior surface of the lens matches the shape of the underlying cornea. The posterior surface of the lens disposed between drive rails 48 and 50 and splines 68 and 70 is blended to from a smooth curve mesh surface within these boundaries.

The front surface of the outer peripheral portion 34 does not have to be shaped to provide optical powers to the lens because it is located outside of the optical region of the contact lens. Thus, the front surface can be smoothly shaped for an exponential drop off from the intersection of the lens with the inner peripheral optical portion 38 at second drive rail 50 to a predetermined minimum edge thickness at the base of lens 26, which is coextensive with circle 106'. Of course, the minimum edge thickness, which occurs at the base of the lens, is dependent upon the lens material and cannot be too thin, to minimize the risk of cracks forming in the contact lens. The front surface of the contact lens in the outer peripheral portion 34 should provide a smooth blend from the juncture with the central optical zone 32 of the lens to the base of the lens so as not to interfere with the wearer's lid.

Figure 9:
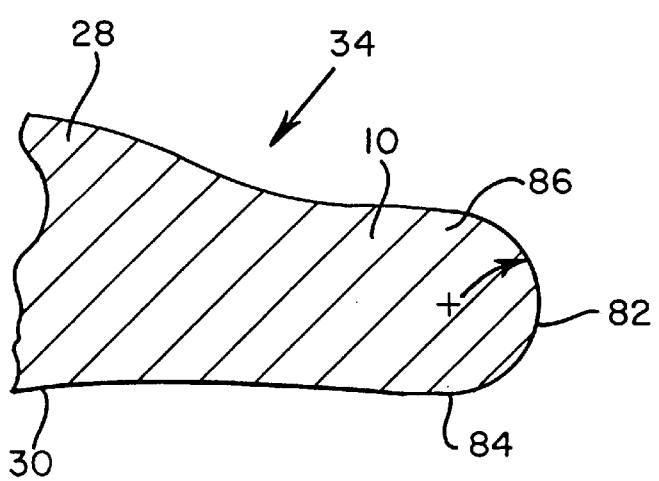
FIG. 9 is a sectional view taken along lines 9—9 of FIG. 8 and looking in the direction of the arrows.

In a currently preferred embodiment of the present invention, the front surface 28 of the outer peripheral portion 34 can be shaped in the form of an S-curve, as viewed in cross-section, to provide a ridge for the upper and lower eyelids to rest upon (See FIG. 9). Thus, the lens will fit comfortably on the eye and the lid will assist in holding the lens on the eye.

Figure 8:
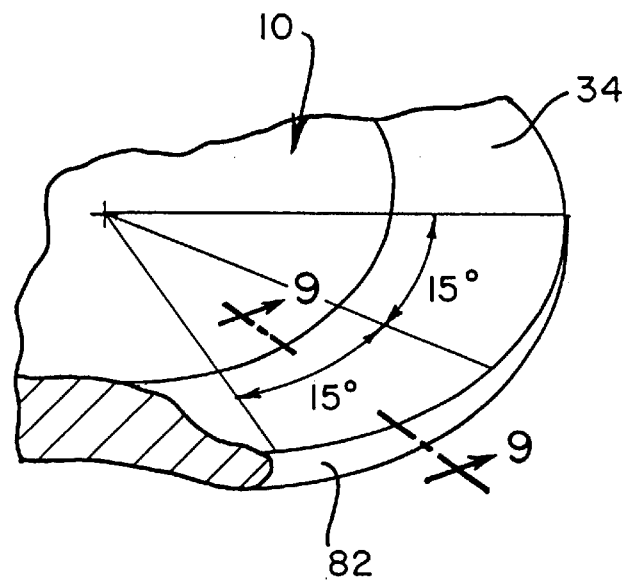
FIG. 8 is a perspective view of a contact lens according to the present invention, with parts broken away.

Referring now to FIGS. 8 and 9, the edge fillet 82 portion of the lens is illustrated. Edge fillet 82 is determined such that the minimum radius is used so that there is a smooth blend between the posterior surface 30 of the lens and the anterior surface 28 of the lens. Because there are twenty-four (24) local surface segments 66 on the outer peripheral portion 34 of the lens, twenty-four (24) different radii r must be determined, one for each local surface segment 66. The boundary 84 of the edge fillet 82 and the posterior surface 30 of the lens is blended so that both surfaces meet at point 84 with the same slope. In other words, the first derivative of the arcuate equation defining the edge fillet 82 and the first derivative of the posterior surface at point 84 are equal. Likewise, the boundary between edge fillet 82 and anterior surface 28 of the lens is at point 86, and both curves meet at this point with the same slope.

The lens surface data, for both the posterior and anterior surfaces, are now routed to the Command Processor 640 from the Computer Aided Design System 630.

In this embodiment, the Computer Aided Design System 630 will generate a post file describing the entire surface, both posterior, anterior and edge fillet surfaces of the lens. The post file is then passed onto the Command Processor 640. In this manner, the anterior, posterior and edge fillet surfaces of the lens are shaped, pursuant to the information from the Command Processor.

The Command Processor 640 accepts the post files, which contain X-Y-Z data describing the surface of the lens to be shaped, and generates a sequence of commands which controls the Shaping System 650. The Command Processor 640 will take the X-Y-Z data from the Computer Aided Design System 630 and use this data to generate the control signals required to control Lens Shaping System 650, which then shapes lens blanks. The Command Processor 640 is adapted to Lens Shaping System 650 and both units are generally available from the manufacturers of the Lens Shaping System 650.

Computer Aided Design Systems such as 630 are commercially available under the tradenames Anvil 5000™ from Manufacturing Consulting Services of Scottsdale, Ariz., Attitude™, AutoMILL™ and AutoSURF™ from Autodesk of Sausalito, Calif.; and CADKEY™ from Cadkey Inc., Manchester, Conn.

Traditionally, lathing techniques have not been adequate to shape lens blanks asymmetrically in three dimensions because they did not have the accuracy or precision of an encoded miller. However, recently developed lathes sold under the trade name of Optiform Lathe™, made by Rank, Taylor, Hobson Ltd. of Leicester, England, have the accuracy and precision of an encoded miller and can cut a lens blank in the Z direction, at least for every 15° interval segment of the lens surface.

In a preferred embodiment, the lens is to be manufactured on a lathe so as to avoid ridges in the surface of the lens. In addition, some laser techniques that ablate material from a lens blank may create pits on the lens surface and are, therefore, not adequate. In an alternate embodiment of the present invention, the Lens Shaping System 650 is a three-centerline rotary encoded mill capable of movement in the X, Y and Z axes, but other systems having the ability to shape lens blanks asymmetrically in three dimensions with a smooth transition (i.e., without sharp angles) could be used instead.

In the preferred lathing process, the lathe cutting tool travels in a spiral fashion from the radial outside of the lens toward the center of the lens. The cutting tool is capable of moving in the Z direction by ±0.2 mm per revolution at 15° intervals. Because of these constraints from the lathe, the lens data is aligned with the orthogonal axis so that the variations in the lens data in the Z-axis will be within ±0.2 mm per revolution. The lathe cutting tool moves radially inwardly by 0.25 microns (or 250 Å) for every complete revolution of the lens blank. Because of the very small distance that the cutting tool travels in the radial direction, the resulting spiral motion of the cutting tool provides a smooth and blended curvature on the surface of the lens. Thus, no further polishing of the cut lens will be required once it is removed from the lathe. Currently, the posterior surface of the lens is cut first and, thereafter, the anterior surface of the lens is cut.

Figure 11:
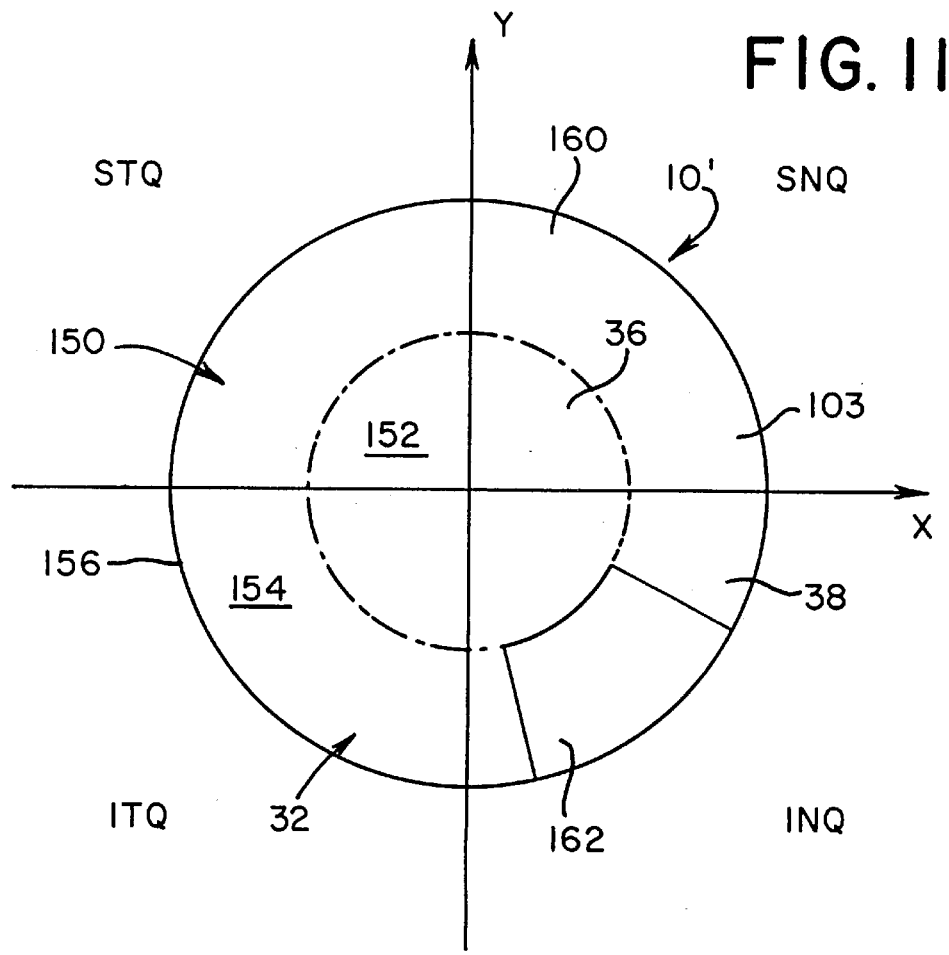
FIG. 11 is an elevational view of a bifocal lens of the invention having a region of relatively enhanced optical power disposed only on one quadrant of the lens surface.

Referring now to FIG. 11, in other embodiments of the present invention, the front surface 28 of the central optical portion 36 can have different shapes. For example, the front surface of center optical portion 36 can be spherical, toric, etc. Conventionally, toric lenses have a major axis and a minor axis that are disposed at 90° with respect to each other because manufacturing limitations (measurement of an arc sweep of less than 90°) in producing the toric surface of the lens limited the axes to being built at 90° intervals. But the major and minor axes of the toric portion of an actual cornea may not, and in most cases is not, disposed at an angle of 90° with respect to each other. In accordance with the present invention, any shape can be cut into the lens including a central toric portion where the major and minor axes are disposed at an angle of other than 90° with respect to each other to correspond to the exact toric relationship required by the patient. In such a case, the Zeiss Simple Lens formula would have to be modified to account for the fact that the major and minor axes are disposed at an angle of other than 90° with respect to each other. In any event, surface modelling as described herein permits measurement of as small an arc sweep as desired and enables those skilled in the art to change the refraction arc appropriately.

In another embodiment of the present invention, the front surface of the lens in the center optical portion 32 can be comprised of a combination of a center spherical portion 36 and a peripheral toric portion 38. The center spherical portion 36 of the central portion 32 is preferably about 2 mm–3½ mm in diameter. The center spherical portion 36 is preferably placed above the highest point of the cornea (i.e., that point on the cornea having the largest Z value). Thus, the lens is shaped so that it will clear over the cornea at its highest point. The center portion 32 is typically about 7 mm–7.5 mm in diameter. The annular portion 38 of the center portion 32 disposed about the center spherical portion 36 is preferably toric shaped to conform to the shape of the underlying cornea. In other words, the toric surface has a major and minor axes 206, 208 that is often disposed at an angle other than 90° with respect to each other. Such a lens will provide a "pin-hole" effect and allows only the central rays to come through to the eye. The center spherical portion is used because spherically shaped lenses provide the best optics. While the eye is an aspheric surface, the cornea is most spherical about its highest point (i.e., this portion of the cornea is most symmetrical). Therefore, it is acceptable for the 2 mm–3 ½ mm diameter center portion of the lens to be spherical to allow the lens to have the best optics, while the remainder of the optical zone is toric.

Figure 12:
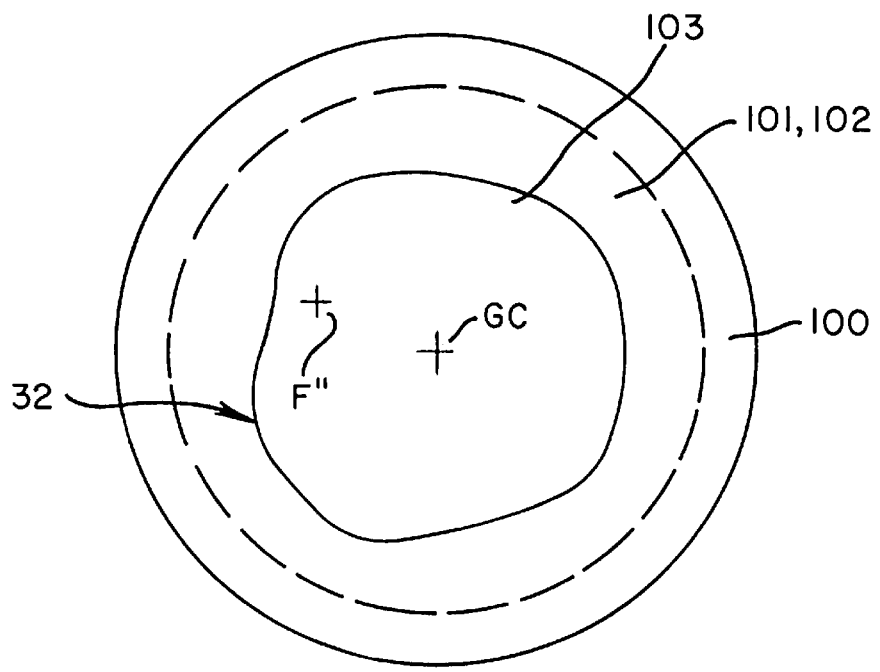
FIG. 12 is an elevational view of a lens having a non-circular boundary between a center optical zone and an outer peripheral zone.

Because it is preferable to place the spherical central portion 36 of the central portion 32 about the highest point F" on the cornea, the center portion 32 of the lens may be offset from the geometric center GC of the eye (See FIG. 13). Additionally, the optical portion of the lens would be offset from the geometric center of the lens. In other embodiments, as illustrated in FIG. 12, the center optical portion 32 may not have a circular boundary, as viewed from top down, with respect to the outer peripheral portion 34, especially if the highest point of the cornea is considerably offset from the geometric center. The outer portion 34 of the lens must have a width of 0.5 mm to 2 mm (in radial dimension) to permit a sufficient surface area of the posterior surface of the lens to asymmetrically and aspherically match the surface of the cornea. Thus, the boundary between the outer topographical portion 34 and the center optical portion 32 may have to be indented somewhat, especially adjacent to the highest point of the cornea F" as illustrated in FIG. 12 when the highest point of the cornea is offset from the geometric center of the lens.

For people who have severe keratoconus corneas, the present invention permits the lens to have the anterior curve of the center optical region 32 be toric while still having an asymmetric aspheric outer peripheral posterior surface. The greatest and smallest radii of the cornea can be measured and the center posterior optical toric region can be made so that the axes match the axes on the eye. As noted above, in most cases these major and minor axes will not be disposed at a 90° angle with respect to each other.

Although traditional lens surfaces are necessarily circular in shape (because of the rotational cutting), no such limitation exists using the shaping techniques and data of the present invention. Using the surface fragments, any lens shape can be lathed, including an oval (ellipsoidal) shaped lens or a lens that is truncated. The variety of lens shapes enabled by use of the present invention allow practitioners to develop new approaches to solving the lens/eyelid interaction problem. The interaction of the eyelid with a contact lens has traditionally been a problem with contact lenses. As the eyelid closes, it tends to impact the edge of the lens and displace the lens from its centered position. By using a lens shape other than circular, such as an truncated shape, the force of the eyelid will be distributed along a longer edge of the contact lens and therefore the lens will have less of a tendency to be displaced. Alternatively, if an oval shaped lens is used, the wider diameter of the oval can be oriented along the vertical meridian of the cornea (i.e., from twelve o'clock to 6 o'clock). Although this orientation will expose the narrowest portion of the lens to the initial contact with the eyelid (which is believed to concentrate the forces from the eyelid to a narrow portion of the lens) the narrow portion will also be supported by the greatest amount of bearing surface. It is anticipated that a noncircular lens design will assist in alleviating, if not preventing, the lens from being dislodged by the action of the eyelid. Similarly, the optical zone area may be decentered relative to outer edge to account for variations in location of the highest point of the cornea without causing the lens to have additional, unintentional prismatic effect.

The asymmetric aspheric posterior surface or surface portion of the contact lens of the present invention, which matches the asymmetric aspheric contour of the cornea, enables the lens to sit much more securely on the cornea and rotate less with respect to the cornea, than any lens of the prior art. This advantage of the present invention has several aspects. First, as described above, the eyelid tends to displace the lens when the wearer blinks. Because the lens of the present invention has a secure seat on the cornea, this displacement is much less likely. Even if the lens does become displaced, surface tension forces will cause it to resume its proper placement (i.e., "centered" position) much more quickly and accurately than any lens of the prior art. Symmetric aspheric lenses of the prior art may require a ballast or "weight", usually an additional mass of lens material, in the inferior quadrant of the lens (the six o'clock position of the lens) to properly orient the lens on the cornea. By the force of gravity, when the patient is upright, the heavier part of the prior art lens tends to rotate to the inferior quadrant of the cornea. In the lens of the present invention, the custom asymmetric contour of the lens will cause the lens to stay centered on the cornea, without the need for a ballast to orient the lens through the operation of gravity. The matched contours of the lens and cornea acts as a "key" to properly center the lens on the cornea. It is preferred that the higher dioptric power portion of the bifocal lens (for sighting near objects) be placed in the inferior nasal quadrant of the lens (this is described in more detail below). It should be noted that the inferior nasal quadrant is unique for the lens of the present invention because of its asymmetry (and asphericity). In other words, a lens fitted for the right eye will fit only the right eye, and cannot be swapped with the lens fitted for the left eye.

A further advantage of the self aligning or self-centering aspect of the lens of the present invention occurs in the application of bi- or multifocal lenses. There are two types of such lenses in the prior art: in the first, the portion of the bi-or multifocal lens that is of a higher power than the rest of the lens is found in the inferior quadrant. In the second type, the central portion of the bi- or multifocal lens is set for distance and the power progressively increases in a radial direction. In order to orient the lens of the first type properly, the practice in the prior art is to place a ballast in the inferior quadrant to allow gravity to orient the lens. As stated above, if the patient is in an inclined position (e.g., reading in bed), the effect of gravity upon the lens is misdirected and the lens has a tendency to rotate and float away from its aligned position. The second type of bifocal or multifocal lens requires no ballast but provides a smaller central field of vision. The first type of bifocal or multifocal lens is preferred in the present invention. Since the lens of the present invention does not need a ballast for alignment, the wearer can assume any position without the lens becoming displacing or rotating from its aligned position. Furthermore, if the bi- or multifocal lens of the invention does become displaced, the lens, floating on the tear film will quickly self align in its proper position on the cornea.

The present invention encompasses soft, hard or gas-permeable contact lenses made without limitation from a variety of commercially available materials, such as hydrophilic polymers (e.g., hydrogels), poly(methyl methacrylate), or rigid gas-permeable polymeric materials such as fluoro-silicone acrylate (Polymer Technology), flexible fluoro polymers (e.g., A-FPP from Ocular Sciences), siloxane acrylate (CooperVision), styrisilicone (Ocutec), 1-butyl styrene/silicone acrylate (PBH), polysulfone-fluoro silicone acrylate (Progressive Optical Research) and fluoropolymer (American Hydron) which are preferred.

Figure 10:
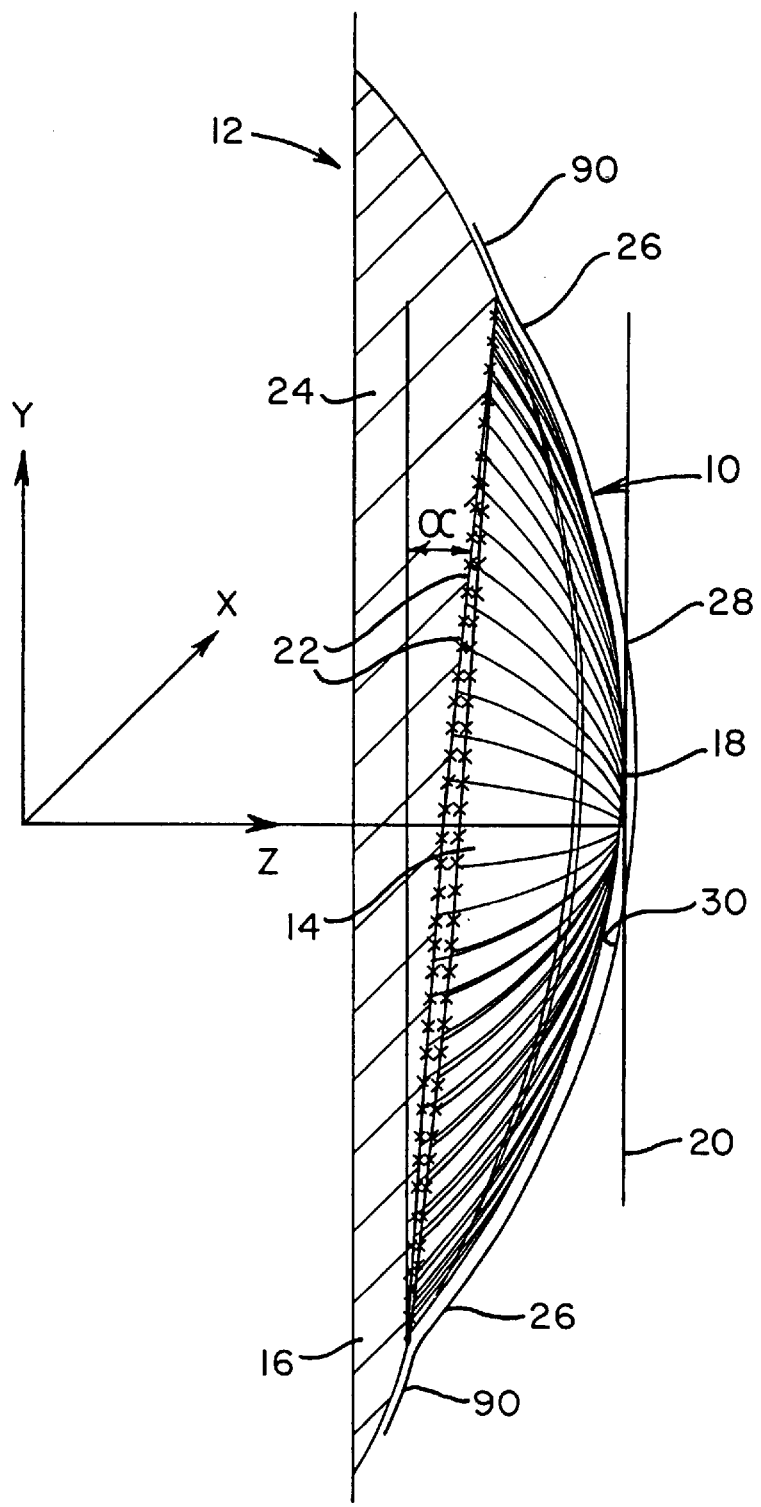
FIG. 10 is a cross-sectional view of a contact lens, which has a scleral skirt, placed on a cornea.

In any of the above embodiments, the contact lens can include a scleral skirt 90 that extends radially outwardly from the outer peripheral portion 54 (See FIG. 10). Scleral skirt 90 drapes over the underlying sclera. The lens of the present invention does not vault from the sclera, it rests thereon. The scleral portion 90 allows the edge of the lens to ride under the upper lid for the purposes of comfort. Therefore, the outer peripheral portion 90 of the posterior surface of the lens "conforms" to the shape of the average sclera so that portion 90 will drape over the sclera.

According to another aspect of the present invention (See FIG. 11), an optical surface of increased dioptric power is provided in the inner peripheral optical portion 38 in the inferior nasal portion of the lens 10', that is, with respect to the eye which the lens is placed on. This portion of increased dioptric power does not extend over the entire lens peripheral optical region. With reference now to FIG. 11, the inner center optical portion 36 of lens 10' (adapted for a right eye) is illustrated in schematic form.

By way of illustration, Cartesian x and y axes are illustrated as crossing within the central portion 36 to define four quadrants, respectively labelled inferior nasal quadrant ("INQ"), superior nasal quadrant ("SNQ"), inferior temporal quadrant ("ITQ"), and superior temporal quadrant ("STQ"). These quadrants of the lens 10' are labeled to correspond to the quadrants of the eye onto which the lens is placed. According to the invention, only a limited portion of the lens has the enhanced optical power required for reading or other near-field activities (such as personal hygiene, cooking, etc.). Preferably, the surface of increased dioptric power is limited substantially to that portion of the inferior nasal quadrant that lies within the inner peripheral optical portion 38. However, all that is important to this embodiment of the present invention is that a second optical region of increased dioptric power relative to a first optical region be asymmetrically disposed on one of the lens' anterior or posterior surfaces. The relative size of the central and peripheral portions should be chosen with reference to individual patient considerations.

In a preferred embodiment, lens 10' has first and second optical regions 160, 162 of first and second refractive powers, respectively. The second optical region 162 (having greater refractive power) occupies a relatively small portion of the anterior (the outwardly facing) surface of the lens whereas the first optical region 160 (having lesser refractive power) occupies the remainder of the anterior surface of the lens 10'. Preferably, the second optical region 162 is positioned substantially within the inferior nasal quadrant of the peripheral portion 38 of the lens. The second optical region 162 may, but does not need to, extend to the edge 156, which corresponds to the second drive rail 50. Thus, according to this preferred embodiment, FIG. 11 illustrates a lens 10' adapted to be placed onto the right eye of the patient. A lens adapted to be placed on the left eye would essentially be a mirror image of FIG. 11. Either or both of the first and second optical regions 160 and 162 may be formed with equal advantage and facility on the posterior surface of the lens, however the posterior surface of the lens is usually topography driven.

While it is generally preferred that the second optical region 162 span the INQ substantially within the peripheral portion 154 of the lens, the invention is not so limited. The second optical region 162 may span an arc length of somewhat more than 90°, for example, 30°–100°.

The first and second optical regions 160 and 162, being of differing refractive power, provide a bifocal lens. The refractive power of the second optical region 162 may exceed that of the remainder of the lens by any number of diopters, e.g., three or more diopters as requested. For example, the central portion 152 of the lens and the peripheral portion 154 that is clear of the optical region 162 together have a refractive power defined by the first optical region 160. It is through this central portion 152 that most of the light rays pass.

The central portion 152 of the lens is preferably spherical. The second optical region 162 is preferably disposed substantially within the peripheral portion 38 of the lens, between nine o'clock and six o'clock for the patient's left eye and between six o'clock and three o'clock for the patient's right eye. The part of the peripheral portion 38 that is outside region 162 has a focal length defined by the first optical region 160. This positioning ensures that the enhanced refractive power of second optical region 162 is disposed within and is preferably substantially coextensive with the INQ. The second optical region 162 provides a focal length to the bifocal lens that differs from that of the first optical region 160, and is asymmetrically disposed on the lens because no corresponding region is provided on an opposite side of the lens, for example, on the superior temporal side of the lens. As a result, the undesirable blur, loss of contrast sensitivity, halo, and the combination of these effects that have been associated with known bifocal lenses for far-field viewing are substantially eliminated because, while viewing far-field objects, relatively few light rays pass through the second optical region 162 of the lens, while substantially all of the light rays required for near-field activities pass through this portion.

Referring now to FIGS. 14 and 15, an orthokeratology contact lens 310, according to the present invention, is illustrated. Orthokeratology lenses intentionally bear upon the underlying cornea to change the corneal surface to a more regular and relatively flatter shape to correct for myopia and, if present, astigmatism. Orthokeratology lenses are typically worn for a period of time (e.g., overnight) and are removed by the user for another period of time (e.g., during the day) so that the user can see with improved visual acuity without the aid of contact lenses or glasses. Because the patient periodically wears what is known as retainer orthokeratology lenses, the cornea essentially remains distorted into the shape of the posterior surface of the relatively hard retainer orthokeratology lens during the relatively short period (e.g., 12–18 hours) that the retainer lenses are not worn. (It should be noted that typically the patient wears a plurality of orthokeratoric lenses which progressively adjust the shape of the cornea until the desired correction is achieved. Thereafter, the patient wears retainer lenses, typically overnight.)

Orthokeratology lens 310 preferably has a central 5 mm diameter portion 300 that has a posterior surface that is shaped to the preferred relatively flatter shape that the cornea is intended to be displaced to provide the unaided eye with optimum visual acuity. However, in the arcuate area defined by an inner peripheral portion 302 bounded between central portion 300 and, at an approximately 7 mm diameter, by an outer peripheral portion 334, the rear surface of the orthokeratology contact lens 310 has a relatively recessed (e.g., steeper) shape to allow the cornea to bulge radially out in this annular region because the cornea is being displaced radially in the area lying under central portion 300. The remaining outer peripheral portion 334 corresponds to the outer peripheral portion 34 of the contact lens discussed above. In other words, the posterior surface of the contact lens in outer peripheral portion 334 asymmetrically and aspherically matches the shape of the underlying cornea. This portion of the lens does not displace the cornea as does the central portion 300 of the orthokeratology lens 310.

Referring now to FIG. 15, the outer surface of the cornea 14 is shown in solid lines in its natural, undeformed shape. The cornea 14 is illustrated in dashed lines, in a greatly exaggerated state, to show the shape of the cornea when it is displaced by the orthokeratology lens 310 according to the present invention.

The cornea is preferably displaced by center portion 300 by volume V1. In addition, the inner peripheral portion 338 is recesses by an appropriate dimension to allow the displaced cornea to bulge out in the inner peripheral portion by volume V2. In a preferred embodiment volume V1 displaced by the central portion 300 is equal to volume V2 that the cornea bulges out in the area lying under the inner peripheral portion 338. Thus, inner peripheral portion 338 is recessed by an amount corresponding to at least volume V1. Contact lens 310 is preferably made of a relatively hard gas-permeable material so as to displace the central portion of the underlying cornea while still permitting sufficient oxygen into the eye.

Of course, the front surface of both the central portion 300 and the inner peripheral portion 338 can be shaped to provide for the required refraction correction of the user, for example, to provide either a spherically shaped front surface or a torically shaped front surface in a similar manner as described above for portions 34, 36 and 38 of lens 10.

Having thus described a preferred embodiment of the present invention, it is to be understood that the above described device and method is merely illustrative of the principles of the present invention, and that other devices may be devised by those skilled in the art without departing from the spirit and scope of the invention as claimed below.

What is claimed is:

1. A contact lens for use with an asymmetric aspherical cornea, said lens comprising:

an anterior surface, a posterior surface and a base, said posterior and anterior surfaces each comprising a center optical portion and an outer peripheral corneal portion, said posterior surface being divided into a plurality of local surface segments by a plurality of radially extending boundaries that originate from a common center point on said posterior surface of the lens, local surface segments on at least the outer peripheral corneal portion conforming to the shape of a corresponding local surface portion of the original asymmetric aspherical cornea that lies under said respective lens local surface segment when the lens is worn on the eye.

2. The lens of claim 1, wherein said lens local surface segments are disposed in said center optical portion.

3. The lens of claim 2, wherein said lens local surface segments comprise at least four segments.

4. The lens of claim 3, wherein said lens local surface segments comprise at least twenty-four segments.

5. The lens of claim 2, wherein said anterior surface is divided into a plurality of local surface segments by a plurality of radially extending boundaries that originate from a common center point on said anterior surface of the lens.

6. The lens of claim 5, wherein said posterior surface and said anterior surface local surface segments are disposed in said center optical portion.

7. The lens of claim 6, wherein said lens local surface segments comprise at least four segments on said posterior surface and at least four segments on said anterior surface.

8. The lens of claim 7, wherein said lens local surface segments comprise at least twenty-four segments on said posterior surface and at least twenty-four segments on said anterior surface.

9. The lens of claim 1, wherein said posterior surface of said outer peripheral cornea portion being divided into a plurality of local surface segments by a plurality of radially extending boundaries that originate from a common center point on said posterior surface of the lens, each of said local surface segments disposed in said outer peripheral cornea portion asymmetrically and aspherically matching a corresponding portion of the cornea that lies under said respective lens local surface segment when the lens is worn on the eye.

10. The lens of claim 9, wherein said lens local surface segments disposed in said outer peripheral cornea portion comprise at least four segments.

11. The lens of claim 10, wherein said lens local surface segments disposed in said outer peripheral cornea portion comprise at least twenty-four segments.

12. The lens of claim 11, wherein said lens local surface segments disposed in said outer peripheral cornea portion comprise at least seventy-two segments.

13. The lens of claim 2, wherein said center optical portion comprises an inner central portion and an inner peripheral portion, said posterior and anterior surfaces of said inner central portion and said inner peripheral portion each being divided into a plurality of local surface segments by said plurality of radially extending boundaries that originate from said common center point on said respective posterior and anterior surfaces.

14. The lens of claim 13, wherein said radially extending boundaries in said posterior surface of said inner central portion are arcuate curves that conform to the shape of the cornea which lies under said radially extending boundaries when the lens is worn on the eye.

15. The lens of claim 14, wherein said radially extending boundaries in said posterior surface of said inner peripheral portion are arcuate curves that conform to the shape of the cornea which lies under said radially extending boundaries when the lens is worn on the eye.

16. The lens of claim 9, wherein said radially extending boundaries in said posterior surface of said outer peripheral corneal portion are splines that match the shape of the cornea which lies under said radially extending boundaries when the lens is worn on the eye.

17. The lens of claim 15, wherein said lens local surface segments disposed on said posterior surface of said inner central potion are a plurality of curve driven surfaces.

18. The lens of claim 18, wherein said lens local surface segments disposed on said posterior surface of said inner peripheral portion are a plurality of curve mesh surfaces.

19. The lens of claim 9, wherein said lens local surface segments disposed on said posterior surface of posterior surface of said outer peripheral portion are a plurality of curve mesh surfaces.

20. The lens of claim 1, wherein said posterior and anterior surfaces of said lens each comprise an outer scleral portion.

21. The lens of claim 1, wherein said anterior surface of said center optical portion being comprised of a central spherically shaped portion and an inner peripheral toric shaped portion.

22. The lens of claim 21, wherein said inner peripheral toric shaped portion has a major and a minor axis that are disposed at an angle of other than 90° with respect to each other.

23. The lens of claim 22, wherein said central spherically shaped portion is offset with respect to a geometric center of said lens.

24. The lens of claim 1, wherein said center optical portion including a second center portion and an annular portion;
a first refractive power region within at least said second center portion; and
a second refractive power region substantially concentrated in a predetermined location within said annular portion on a nasal side of the lens relative to the eye upon placement on the eye, said second refractive power region being of greater refractive power than said first refractive power region.

25. The lens of claim 24, wherein said second power region is substantially concentrated only in said predetermined location.

26. The lens of claim 25, wherein said predetermined location is disposed on an inferior side of the lens relative to the eye.

27. The lens of claim 1, wherein said anterior surface of said center optical portion is spherical.

28. The lens of claim 1, wherein said anterior surface of said center optical portion is toric.

29. The lens of claim 28, wherein a major and a minor axis of said anterior surface of said center optical portion are disposed at an angle of other than 90 degrees with respect to each other.

30. The lens of claim 1, wherein a center of said lens is disposed over a high point of the cornea when the lens is worn on the eye.

* * * * *